US010165617B2

United States Patent
Chen et al.

(10) Patent No.: US 10,165,617 B2
(45) Date of Patent: Dec. 25, 2018

(54) METHODS OF ADAPTING RECEIVER CONFIGURATION FOR CONTROL CHANNEL RECEPTION BASED ON DRX STATUS

(71) Applicant: Telefonaktiebolaget LM Ericsson (publ), Stockholm (SE)

(72) Inventors: Maomao Chen, Arlov (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/316,176

(22) PCT Filed: Apr. 13, 2016

(86) PCT No.: PCT/EP2016/058152
§ 371 (c)(1),
(2) Date: Dec. 4, 2016

(87) PCT Pub. No.: WO2016/166182
PCT Pub. Date: Oct. 20, 2016

(65) Prior Publication Data
US 2018/0027424 A1    Jan. 25, 2018

Related U.S. Application Data

(60) Provisional application No. 62/146,584, filed on Apr. 13, 2015.

(51) Int. Cl.
*H04W 76/28* (2018.01)
*H04W 24/02* (2009.01)

(52) U.S. Cl.
CPC ........... *H04W 76/28* (2018.02); *H04W 24/02* (2013.01)

(58) Field of Classification Search
CPC ..................................................... H04W 24/02
(Continued)

(56) References Cited

U.S. PATENT DOCUMENTS

| 2013/0040697 A1* | 2/2013 | Ekici | H04W 48/18 455/552.1 |
| 2013/0051351 A1* | 2/2013 | Seo | H04J 11/0056 370/329 |
| 2013/0084855 A1* | 4/2013 | Ekici | H04W 48/18 455/432.1 |

FOREIGN PATENT DOCUMENTS

WO    2014022847 A1    2/2014

OTHER PUBLICATIONS

PCT International Search Report, dated Jul. 12, 2016, in connection with International Application No. PCT/EP2016/058152, all pages.
(Continued)

*Primary Examiner* — Joel Ajayi
(74) *Attorney, Agent, or Firm* — Sage Patent Group

(57) ABSTRACT

A method performed in a wireless device (300) of a cellular communication system is disclosed. The wireless device (300) has a first receiver configuration and a second receiver configuration and is capable of operating in DRX. The method comprises determining (110) a DRX configuration of the wireless device, wherein the DRX configuration indicates a time period during which the wireless device (300) should monitor a control channel. The method further comprises monitoring (120) the control channel during said time period using the first receiver configuration if the DRX configuration is a first DRX configuration or monitoring (130) the control channel during said time period using the second receiver configuration if the DRX configuration is a second DRX configuration. A method in a network node, a
(Continued)

wireless device, a network node, computer program products, and computer-readable media are also disclosed.

32 Claims, 3 Drawing Sheets

(58) Field of Classification Search
USPC .......................................................... 455/450
See application file for complete search history.

(56) References Cited

OTHER PUBLICATIONS

PCT Written Opinion, dated Jul. 12, 2016, in connection with International Application No. PCT/EP2016/058152, all pages.
3GPP TS 36.201 V10.0.0 (Dec. 2010), 3rd Generation Partnership Project; Technical Specification Group Radio Access Network; Evolved Universal Terrestrial Radio Access (E-UTRA); LTE physical layer; General description (Release 10), 13 pages.
3GPP TS 36.321 V11.6.0 (Mar. 2015), 3rd Generation Partnership Project; Technical Specification Group Radio Access Network; Evolved Universal Terrestrial Radio Access (E-UTRA); Medium Access Control (MAC) protocol specification (Release 11); 57 pages.
3GPP TSG-RAN WG2 #77bis, R2-121517, Jeju, South Korea, Mar. 26-30, 2012, Further discussion on UE-supported DRX configuration, 4 pages.

* cited by examiner

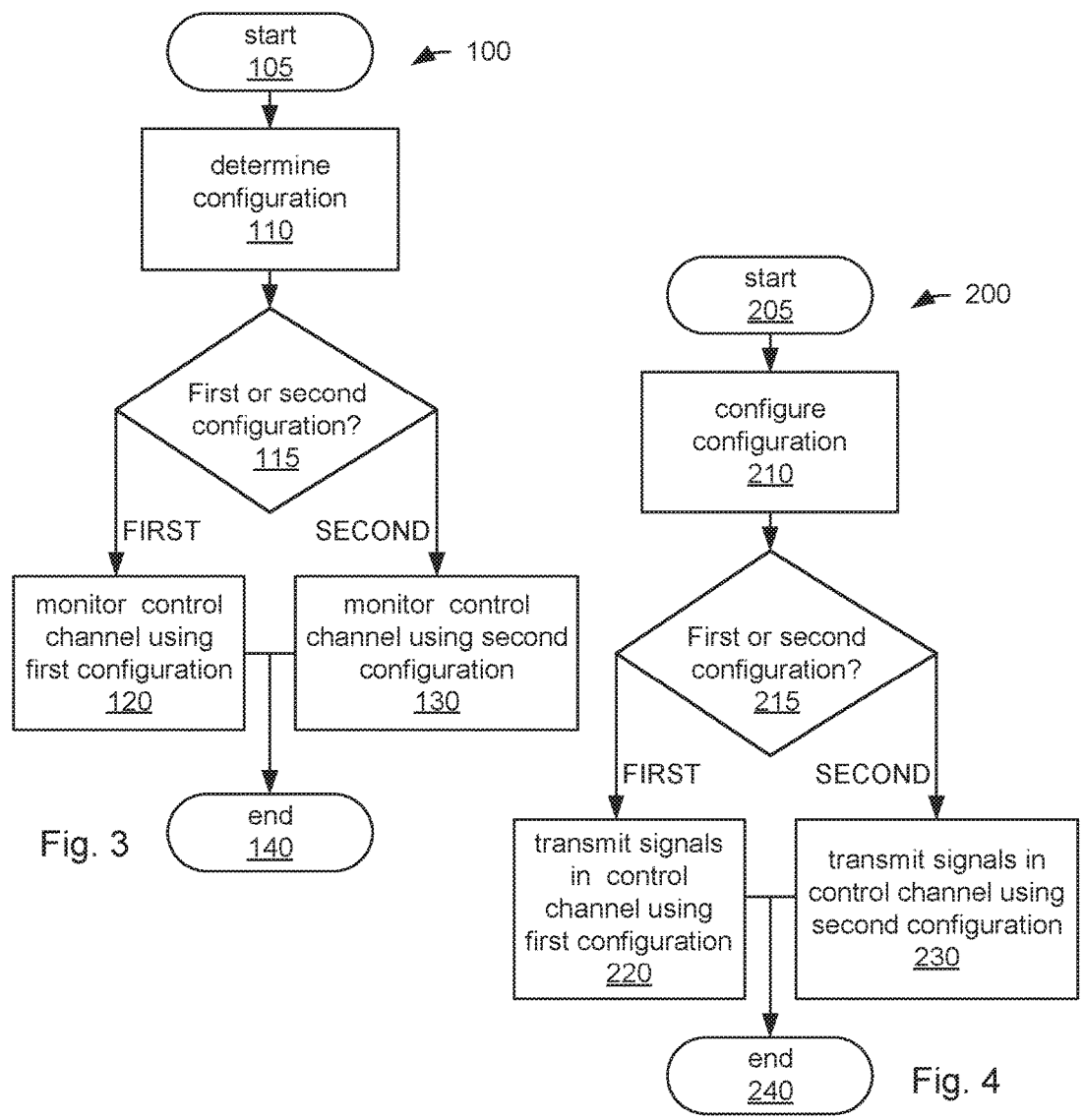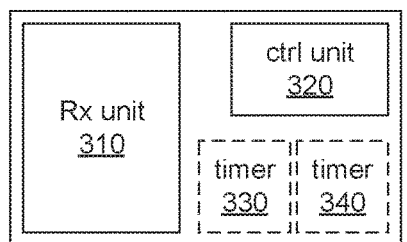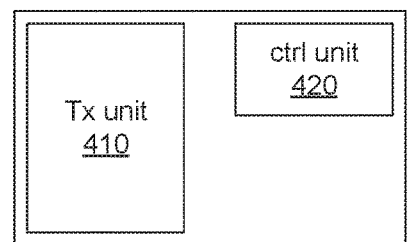

METHODS OF ADAPTING RECEIVER CONFIGURATION FOR CONTROL CHANNEL RECEPTION BASED ON DRX STATUS

CROSS-REFERENCE TO RELATED APPLICATIONS

This application is a national stage application under 35U.S.C. § 371 of PCT/EP 2016/058152, filed Apr. 13, 2016, which claims the benefit of U.S. Provisional Application No. 62/146,584, filed Apr. 13, 2015, which applications are hereby incorporated herein by reference in their entireties.

TECHNICAL FIELD

The present disclosure relates in general to configuration of receivers in cellular communications systems and related techniques.

BACKGROUND

MIMO Systems

It is well known that MIMO systems can significantly increase the data carrying capacity of wireless systems. Multiple antennas for transmission and reception are used for improving both the user- and cell throughput and are key factors behind the high performance offered by 3GPP (3rd generation partnership program) LTE (long-term evolution) standard. Starting from Rel-10 up to 8 layers is supported, see e.g. Sec. 4.2.1 in 3GPP TS 36.201, 3rd Generation Partnership Project; Technical Specification Group Radio Access Network; Evolved Universal Terrestrial Radio Access (E-UTRA); LTE physical layer; General description, Release 10, V10.0.0. However, the UE (User Equipment) performance requirements are still based on the use of 2 receive antenna ports (AP); there are no requirements for a UE that can be equipped with more than two antenna ports for achieving additional diversity gain and/or multiplexing gain.

With 4 Rx (Mx4) MIMO system (e.g. 4×4 MIMO or 8×4 MIMO i.e. M=4 or 8), up to four layer spatial multiplexing is supported. With 4 Rx AP (antenna ports) an 8×4 MIMO system with four layer spatial multiplexing is capable of utilizing both beam forming and diversity gain in maximum level. These layers can be combined through dynamic beam-forming and MIMO receiver processing to increase reliability of the received signal at the UE and the range of the UE in the cell. From a performance point of view the use of 4 Rx AP allows higher UE data rates in a wide range of scenarios and improved receiver sensitivity in general. Depending on the target signal quality at the UE (e.g. SNR or SINR region), the transmission scheme (e.g. 4×4 MIMO) used in the network node (e.g. eNodeB) and the channel conditions, the peak user throughput can be doubled compared to dual-layer multiplexing by virtue of additional receiver diversity gain and/or multiplexing gain at the UE. Additionally, due to the improved UE receiver sensitivity, cell coverage may under ideal circumstances be doubled, resulting in fewer blind spots entirely lacking signal reception at the UE. The improved UE receiver sensitivity herein means for example that the minimum mean power received at the UE capable of 4 Rx can be lower than that received at the UE capable of less than 4 Rx e.g. 1 Rx or 2 RX.

Note that terminology such as NodeB or eNode B and UE should be considering non-limiting and does in particular not imply a certain hierarchical relation between the two, in general "NodeB" could be considered as device 1 and "UE" device 2, and these two devices communicate with each other over some radio channel. Herein, we also focus on wireless transmissions in the downlink, but some embodiments are equally applicable in the uplink.

The term "network node" is used in some parts of this disclosure as a generic term for bases stations, such as NodeB or eNodeB. Furthermore, the term "wireless device" is used in some parts of this disclosure as a generic term for devices such as UEs.

Interference Mitigation

Interference mitigation is a technique used to at least partly mitigate inter-cell interference. In the UE the inter-cell interference mitigation receiver at least partly mitigates interference caused by the one or more radio signals transmitted by one or more interfering cells aka aggressor cells, neighbor cells etc.

The terms interference mitigation (IM) receiver, interference cancellation (IC) receiver, interference suppression receiver, interference rejection receiver, interference aware receiver, interference avoidance receiver, or any combination thereof are interchangeably used but they all belong to a category of an advanced receiver or an enhanced receiver. Interference cancellation or suppression by such advanced receiver structures can lead to the elimination of the interference, in which case the interference is completely cancelled, whereas in other cases the impact of interference on the useful signal is reduced. Hereinafter for the sake of consistency the term IM is used.

Examples of useful signals, which are intended to be received at the UE, are data channel (e.g. PDSCH), control channels (e.g. PDCCH, EPDCCH etc), common channel (e.g. PBCH), physical signals such as reference signals or pilot signals (e.g. CRS, PRS, discovery signals, PSS, SSS etc).

Examples of signals or channels whose interference from one or more interfering cells at the UE can be mitigated by the UE in LTE are PDSCH, PDCCH, PCFICH, PCFICH, EPDCCH, PBCH, CRS, PRS, etc. Examples of signals or channels whose interference from one or more interfering cells at the UE can be mitigated by the UE in HSPA are HS-PDSCH, HS-SCCH, P-CPICH, S-CPICH, DPCCH, F-DPCCH, etc.

An example of baseline receiver, which does not mitigate interference from interfering cells, is MMSE-MRC.

Examples of IM receivers which can be used for mitigating interference caused by data or control channels (e.g. PDSCH, PDCCH/PCFICH) transmissions in one or more interference cells are MMSE-IRC, E-MMSE-IRC, R-ML, CWIC, iterative ML etc.

Examples of IM receivers which can be used for mitigating interference caused by physical signals (e.g. discovery signals, CRS, PSS, PRS, SSS etc) transmissions in one or more interference cells are reference signal IM such as CRS-IM (aka CRS-IC) etc.

In practice the UE may also apply combination of IM receivers to mitigate interference caused by one or more interfering cells. For example a UE may mitigate interference caused by PDSCH as well as CRS transmissions in an interfering cell (e.g. cell2) when receiving a control channel (e.g. PDCCH) from the serving cell (e.g. cell1). As an example the UE may use combination of IM receivers comprising of MMSE-IRC, CWIC and CRS-IM to mitigate interference caused by control/data, PDSCH and CRS transmissions from cell2.

DRX Cycle Operation

In LTE DRX (Discontinuous reception) cycle is used to enable UE to save its battery. The DRX cycle is used in RRC idle state but it can also be used in RRC connected state. When operating in DRX or using DRX cycle, the UE is interchangeably called being in 'DRX state' or 'DRX mode' or 'DRX operation' or 'DRX operational state or mode'. For consistency hereinafter, the term DRX state is used.

Examples of lengths of DRX cycles used in RRC idle state 320 ms, 640 ms, 1.28 s and 2.56 s. Examples of lengths of DLX cycles used in RRC connected state may range from 2 ms to 2.56 s. The DRX cycle is configured by the network node and is characterized by the following parameters:

- On duration: During the on duration of the DRX cycle, a timer called 'onDurationTimer', which is configured by the network node, is running. This timer specifies the number of consecutive control channel subframes (e.g. PDCCH, ePDCCH subframe(s)) at the beginning of a DRX Cycle. It is also interchangeably called DRX ON period. More specifically it is the duration in downlink subframes that the UE after waking up from DRX to receive control channel (e.g. PDCCH, ePDCCH). If the UE successfully decodes the control channel (e.g. PDCCH, ePDCCH) during the ON duration then the UE starts a drx-inactivity timer (see below) and stays awake until its expiry. When the onDurationTimer is running the UE is considered to be in DRX state of the DRX cycle.
- drx-inactivity timer: It specifies the number of consecutive control channel (e.g. PDCCH, ePDCCH) subframe(s) after the subframe in which a control channel (e.g. PDCCH) indicates an initial UL or DL user data transmission for this MAC entity. It is also configured by the network node. When the drx-inactivity timer is running the UE is considered to be in non-DRX state i.e. no DRX is used.
- Active time: This time is the duration during which the UE monitors the control channel (e.g. PDCCH, ePDCCH). In other words this is the total duration during which the UE is awake. This includes the "on-duration" of the DRX cycle, the time during which the UE is performing continuous reception while the inactivity timer has not expired and the time the UE is performing continuous reception while waiting for a DL retransmission after one HARQ RTT. The minimum active time is equal to the length of an on duration, and the maximum active time is undefined (infinite).

The DRX ON and DRX OFF durations of the DRX cycle are shown in FIG. 1. The DRX operation with more detailed parameters in LTE is illustrated in FIG. 2.

SUMMARY

Embodiments disclosed herein seek to accomplish a reasonable compromise between performance and power consumption.

According to a first aspect, there is provided a method, performed in a wireless device of a cellular communication system, wherein the wireless device has a first receiver configuration and a second receiver configuration and is capable of operating in discontinuous reception (DRX), of monitoring a control channel of the cellular communication system. The method comprises determining a DRX configuration of the wireless device, wherein the DRX configuration indicates a time period during which the wireless device should monitor the control channel. Furthermore, the method comprises monitoring the control channel during said time period using the first receiver configuration if the DRX configuration is a first DRX configuration, or monitoring the control channel during said time period using the second receiver configuration if the DRX configuration is a second DRX configuration.

In some embodiments, the first receiver configuration provides an enhanced reception performance compared with the second receiver configuration.

The wireless device may have a plurality of antenna ports. The wireless device may be configured to use a first number M of antenna ports in the first receiver configuration and a second number L, smaller than M, of antenna ports in the second receiver configuration.

The wireless device may be configured to apply a certain interference-mitigation technique to a receiver of the wireless device in the first receiver configuration, and to not apply the certain interference-mitigation technique to said receiver in the second receiver configuration.

The wireless device may be configured to operate in a DRX state in the first DRX configuration, and operate in a non-DRX state in the second DRX configuration.

The wireless device may be configured to operate in a DRX state with a first DRX ON duration in the first DRX configuration, and operate in a DRX state with a second DRX ON duration in the second DRX configuration, wherein the first DRX ON duration is shorter than the second DRX ON duration. The DRX ON duration is the time period during which the wireless device should monitor the control channel.

In some embodiments, the DRX configuration is the second DRX configuration if the wireless device operates in a DRX state with a DRX ON duration that exceeds a first threshold, and the DRX configuration is the first DRX configuration if the wireless device operates in a DRX state with a DRX ON duration that is less than or equal to the first threshold.

The wireless device may be configured to operate in a DRX state with a first DRX cycle in the first DRX configuration, and operate in a DRX state with a second DRX cycle in the second DRX configuration, wherein the first DRX cycle is longer than the second DRX cycle.

In some embodiments, the DRX configuration is the first DRX configuration if the wireless device operates in a DRX state with a DRX cycle length that exceeds a second threshold, and DRX configuration is the second DRX configuration if the wireless device operates in a DRX state with a DRX cycle length that is less than or equal to the second threshold.

The wireless device may comprise a first timer and a second timer. The method may comprise starting the first timer at the beginning of said time period and monitoring the control channel until the first timer expires using the first receiver configuration if the DRX configuration is the first DRX configuration, or starting the second timer at the beginning of said time period and monitoring the control channel until the second timer expires using the second receiver configuration if the DRX configuration is the second DRX configuration.

According to a second aspect, there is provided a method, performed in a network node of a cellular communication system, wherein a wireless device of the cellular communication system is capable of operating in discontinuous reception (DRX) and wherein the network node has a first transmitter configuration and a second transmitter configuration, of transmitting signals to the wireless device. The method comprises configuring a DRX configuration of the wireless device, wherein the DRX configuration indicates a time period during which the wireless device should monitor a control channel of the cellular communication system. The method further comprises transmitting signals over the control channel to the wireless device during said time period using the first transmitter configuration if the DRX configuration is a first DRX configuration, or transmitting signals over the control channel to the wireless device during said time period using the second transmitter configuration if the DRX configuration is a second DRX configuration.

In some embodiments, the second transmitter configuration provides an enhanced transmission performance compared with the first transmitter configuration.

The network node may be configured to use a first transmission power level $P_1$ in the first transmitter configuration and a second transmission power level $P_2$, higher than $P_1$, in the second transmitter configuration.

The network node may be configured to use a first aggregation level in the first transmitter configuration and a second aggregation level, higher than the first aggregation level, in the second transmitter configuration.

The wireless device may be configured to operate in a DILX state in the first DRX configuration, and operate in a non-DRX state in the second DRX configuration.

The wireless device may be configured to operate in a DRX state with a first DRX ON duration in the first DRX configuration, and operate in a DRX state with a second DRX ON duration in the second DRX configuration, wherein the first DRX ON duration is shorter than the second DRX ON duration. The DRX ON duration is the time period during which the wireless device should monitor the control channel.

In some embodiments, the DRX configuration is the second DRX configuration if the wireless device operates in a DRX state with a DRX ON duration that exceeds a first threshold, and the DRX configuration is the first DRX configuration if the wireless device operates in a DRX state with a DRX ON duration that is less than or equal to the first threshold.

The wireless device may be configured to operate in a DRX state with a first DRX cycle in the first DRX configuration, and operate in a DRX state with a second DRX cycle in the second DRX configuration, wherein the first DRX cycle is longer than the second DRX cycle.

In some embodiments, the DRX configuration is the first DRX configuration if the wireless device operates in a DRX state with a DRX cycle length that exceeds a second threshold, and DRX configuration is the second DRX configuration if the wireless device operates in a DRX state with a DRX cycle length that is less than or equal to the second threshold.

The method may further comprise transmitting the information about the first transmitter configuration and the second transmitter configuration to another network node.

According to a third aspect, there is provided a method performed in a cellular communication system. The cellular communication system comprises a network node and a wireless device. The method comprises performing, in the network node, the method according to the second aspect. Furthermore, the method comprises performing, in the wireless device, the method according to the first aspect.

According to a fourth aspect, there is provided a computer program product comprising computer program code for executing the method according to the first aspect when said computer program code is executed by a programmable control unit of the wireless device.

According to a fifth aspect, there is provided a computer readable medium having stored thereon a computer program product comprising computer program code for executing the method according to the first aspect when said computer program code is executed by a programmable control unit of the wireless device.

According to a sixth aspect, there is provided a computer program product comprising computer program code for executing the method according to the second aspect when said computer program code is executed by a programmable control unit of the network node.

According to a seventh aspect, there is provided a computer readable medium having stored thereon a computer program product comprising computer program code for executing the method according to the second aspect when said computer program code is executed by a programmable control unit of the wireless device.

According to an eighth aspect, there is provided a wireless device for a cellular communication system. The wireless device is capable of capable of operating in discontinuous reception (DRX). The wireless device comprises a receiver unit having a first receiver configuration and a second receiver configuration, and a control unit operatively connected to the receiver unit. The control unit is adapted to determine a DRX configuration of the wireless device, wherein the DRX configuration indicates a time period during which the wireless device should monitor the control channel. Furthermore, the control unit is configured to control the receiver unit to monitor the control channel during said time period using the first receiver configuration if the DRX configuration is a first DRX configuration, or monitor the control channel during said time period using the second receiver configuration if the DRX configuration is a second DRX configuration.

In some embodiments, the first receiver configuration provides an enhanced reception performance compared with the second receiver configuration.

The receiver unit may have a plurality of antenna ports and may be configured to use a first number M of antenna ports in the first receiver configuration and a second number L, smaller than M, of antenna ports in the second receiver configuration.

The receiver unit may be configured to apply a certain interference-mitigation technique to a receiver of the wireless device in the first receiver configuration, and to not apply the certain interference-mitigation technique to said receiver in the second receiver configuration.

The wireless device may be configured to operate in a DRX state in the first DRX configuration, and operate in a non-DRX state in the second DRX configuration.

The wireless device may be configured to operate in a DRX state with a first DRX ON duration in the first DRX configuration, and operate in a DRX state with a second DRX ON duration in the second DRX configuration, wherein the first DRX ON duration is shorter than the second DRX ON duration. The DRX ON duration is the time period during which the wireless device should monitor the control channel.

In some embodiments, the DRX configuration is the second DRX configuration if the wireless device operates in a DRX state with a DRX ON duration that exceeds a first threshold, and the DRX configuration is the first DRX configuration if the wireless device operates in a DRX state with a DRX ON duration that is less than or equal to the first threshold.

The wireless device may be configured to operate in a DRX state with a first DRX cycle in the first DRX configuration, and operate in a DRX state with a second DRX cycle in the second DRX configuration, wherein the first DRX cycle is longer than the second DRX cycle.

In some embodiments, the DRX configuration is the first DRX configuration if the wireless device operates in a DRX state with a DRX cycle length that exceeds a second threshold, and DRX configuration is the second DRX configuration if the wireless device operates in a DRX state with a DRX cycle length that is less than or equal to the second threshold.

The wireless device may comprise a first timer and a second timer. The control unit may be configured to start the first timer at the beginning of said time period and control the receiver unit to monitor the control channel until the first timer expires using the first receiver configuration if the DRX configuration is the first DRX configuration, or start the second timer at the beginning of said time period and control the receiver unit to monitor the control channel until the second timer expires using the second receiver configuration if the DRX configuration is the second DRX configuration.

According to a ninth aspect, there is provided a network node, configured to operate within a cellular communication system wherein a wireless device of the cellular communication system is capable of operating in discontinuous reception (DRX). The network node comprises a transmitter unit having a first transmitter configuration and a second transmitter configuration. Furthermore, the network node comprises a control unit operatively connected to the transmitter unit. The control unit is adapted to configure a DRX configuration of the wireless device, wherein the DRX configuration indicates a time period during which the wireless device should monitor a control channel of the cellular communication system. Furthermore, the control unit is adapted to control the transmitter unit transmit signals over the control channel to the wireless device during said time period using the first transmitter configuration if the DRX configuration is a first DRX configuration, or transmit signals over the control channel to the wireless device during said time period using the second transmitter configuration if the DRX configuration is a second DRX configuration.

In some embodiments, the second transmitter configuration provides an enhanced transmission performance compared with the first transmitter configuration.

The network node may be configured to use a first transmission power level $P_1$ in the first transmitter configuration and a second transmission power level $P_2$, higher than $P_1$, in the second transmitter configuration.

The network node may be configured to use a first aggregation level in the first transmitter configuration and a second aggregation level, higher than the first aggregation level, in the second transmitter configuration.

The wireless device may be configured to operate in a DRX state in the first DRX configuration, and operate in a non-DRX state in the second DRX configuration.

The wireless device may be configured to operate in a DRX state with a first DRX ON duration in the first DRX configuration, and operate in a DRX state with a second DRX ON duration in the second DRX configuration, wherein the first DRX ON duration is shorter than the second DRX ON duration. The DRX ON duration is the time period during which the wireless device should monitor the control channel.

In some embodiments, the DRX configuration is the second DRX configuration if the wireless device operates in a DRX state with a DRX ON duration that exceeds a first threshold, and the DRX configuration is the first DRX configuration if the wireless device operates in a DRX state with a DRX ON duration that is less than or equal to the first threshold.

The wireless device may be configured to operate in a DRX state with a first DRX cycle in the first DRX configuration, and operate in a DRX state with a second DRX cycle in the second DRX configuration, wherein the first DRX cycle is longer than the second DRX cycle.

In some embodiments, the DRX configuration is the first DRX configuration if the wireless device operates in a DRX state with a DRX cycle length that exceeds a second threshold, and DRX configuration is the second DRX configuration if the wireless device operates in a DRX state with a DRX cycle length that is less than or equal to the second threshold.

The network node may be configured to transmit information about the first transmitter configuration and the second transmitter configuration to another network node.

According to a tenth aspect, there is provided a cellular communication system comprising a network node according to the ninth aspect and a wireless device according to the eighth aspect.

BRIEF DESCRIPTION OF THE DRAWINGS

Further objects, features and advantages of embodiments of the disclosure will appear from the following detailed description, reference being made to the accompanying drawings, in which:

FIGS. 3-4 show flow-charts.
FIGS. 5-6 show block diagrams.

DETAILED DESCRIPTION

Figure 1:
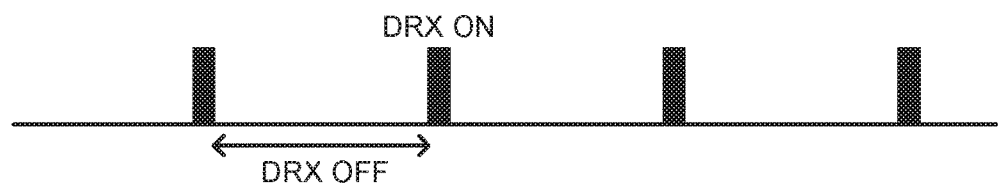
FIG. 1 illustrates DRX ON and DRX OFF periods.
Figure 2:
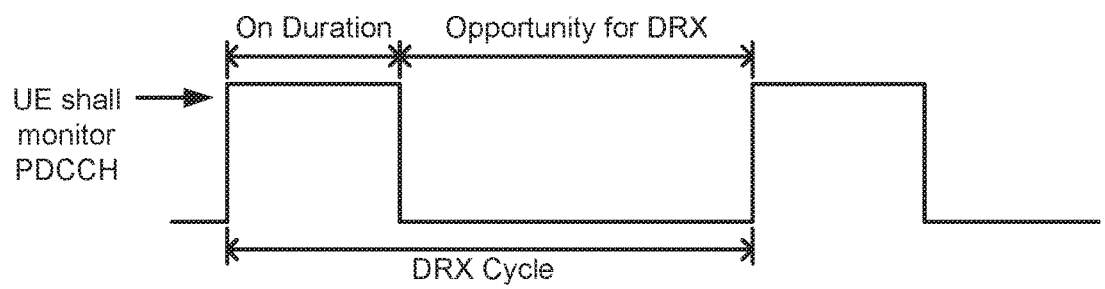
FIG. 2 illustrates DRX cycle operation in LTE.

When 4Rx AP are enabled by the UE for receiving signals then the power consumption, complexity, processing, memory requirements and cost compared to 2 Rx antenna operations are dramatically increased. Such 4Rx capable UE needs to have 2 extra receive chains compared to 2Rx only which will increase the receiver RF power consumption by 40-50% and the baseband processing is increased with higher power consumption too. One of the main benefits of using 4Rx is when the UE uses them for UE demodulation (i.e. for receiving data such as on PDSCH) leading to higher user throughput gain. When the performance gain is big enough the power consumption can be justified by such performance improvement. But when the performance gain cannot be guaranteed or there is no data transmission the power consumption may negatively impact the UE performance (e.g. increase in power consumption, processing etc).

The UE capable of one or more IM receivers may apply them to mitigate inter-cell interference when decoding one or more DL physical channels (e.g. PDSCH, PDCCH) from one or more serving cells. The UE has to monitor one or DL more control channels (e.g. PDCCH, EPDCCH) continuously e.g. in every subframe. Therefore the use of IM mitigation receivers for decoding control channels may dramatically increase the UE power consumption over time. This may also increase UE complexity and would require more memory and processing resources. The UE power consumption and complexity are even further increased when the UE uses multiple receiver antennas (e.g. 4 antennas) and also applies IM receiver(s) on each antenna port for decoding one or more DL control channels.

For control channels (i.e. PDCCH, PCFICH, PBCH) that are not directly linked to throughput improvement the UE may simply use 2 Rx and/or simple receiver structure instead of 4 Rx and/or advanced receiver structure in order to save power consumption. Under this assumption when the UE starts monitoring control channels when DRX cycle is used, the UE receiver structure is not optimized with 2 Rx, so the control channel performance can degrade. In the meanwhile the coverage with 2 Rx becomes smaller. The inventors have therefore realized that a solution which leads to a reasonable compromise between performance enhancement and UE power consumption is needed.

An underlying idea behind some embodiments is that a UE capable of multiple receivers (e.g. 4 Rx) and/or one or more inter-cell IM receivers (e.g. CRS-IM, PDSCH IM etc) uses one or more IM receivers (e.g. CRS-IM, MMSE-IRC, CWIC etc) and/or uses larger number of antennas (e.g. 4 Rx) for receiving one or more DL control channels during ON duration of a DRX cycle or during ON duration only when ON duration≤threshold1 and/or when the DRX cycle length is >threshold2 (e.g. 40 ms); otherwise when UE is in non-DRX or when DRX ON>threshold1 or when DRX cycle length≤threshold2, then the UE uses fewer antennas (e.g. 2 Rx) and/or non-IM receivers for receiving one or more DL control channels. In some embodiments, the network node uses lower power to transmit one or more DL control channels when the UE uses larger number of receive antennas and/or one or more IM receivers, and higher power to transmit one or more DL control channels when the UE uses fewer receive antennas and/or non-IM receivers for receiving such control channels. The method in the UE can be specified as pre-defined rule(s) in the standard.

In some embodiments, a method in a UE capable of multiple receiver antennas and/or having at least one inter-cell IM receiver served by at least a first cell managed by a first network node comprises the steps of:
  Obtaining information about status of DRX configuration (e.g. DRX cycle length, ON duration, threshold of ON duration (D), threshold of DRX cycle (T), whether UE is on DRX or non-DRX state, etc) for monitoring at least a first control channel from at least the first serving cell;
  determining based on the obtained information, a first receiver timer value ($\delta t_1$), a second receiver timer value ($\delta t_2$) and when the $\delta t_1$ and the $\delta t_2$ are or expected to be started by the UE
  Monitoring the first control channel using:
    a first receiver configuration comprising of M receive antennas and/or IM receivers while the determined first receiver timer $\delta t_1$ is running and
    a second receiver configuration comprising of L receive antennas and/or non-IM receivers while the determined second receiver timer $\delta t_2$ is running wherein L<M.
  Transmitting (optionally) the information about one or more of the obtained information about the DRX configuration status and/or the first receiver configuration used during $\delta t_1$ and the second receiver configuration used during $\delta t_2$ to the first network node.

In some embodiments, a method in a first network node serving a UE capable of multiple receiver antennas served by at least a first serving cell comprises the steps of:
  Obtaining information about at least the status of the DRX configuration (e.g. DRX cycle length, ON duration, threshold of ON duration (D), threshold of DRX cycle (T), whether UE is on DRX or non-DRX state, etc) being used or expected to be used by the UE for monitoring at least a first control channel from at least the first serving cell;
  determining based on the obtained information a first receiver timer value ($\delta t_1$) and a second receiver timer value ($\delta t_2$) and when the $\delta t_1$ and the $\delta t_2$ are or expected to be started by the UE;
  Determining:
    a first radio resource configuration ($R_1$) for transmitting the first control channel to the UE while the first receiver timer $\delta t_1$ is running and during which the UE uses a first receiver configuration comprising of M receive antennas and/or at least one IM capable receiver for the reception of the first control channel, and
    a second radio resource configuration ($R_2$) for transmitting the first control channel to the UE while the second receiver timer $\delta t_2$ is running and during which the UE uses a second receiver configuration comprising of L receive antennas and/or non-IM capable receiver for the reception of the first control channel, wherein L<M;
  Transmitting the first control channel to the UE with configuration $R_1$ while the timer $\delta t_1$ is running and with configuration $R_2$ otherwise.
As a particular example:
  $R_1$ is a first transmit power level ($P_1$) used for transmitting the first control channel to the UE while the first receiver timer $\delta t_1$ is running and during which the UE uses a first receiver configuration comprising of M receive antennas and/or at least one IM capable receiver for the reception of the first control channel.
  $R_2$ is a second transmit power level ($P_2$) for transmitting the first control channel to the UE while the second receiver timer $\delta t_2$ is running and during which the UE uses a second receiver configuration comprising of L receive antennas and/or non-IM capable receiver for the reception of the first control channel, wherein L<M and $P_1$<$P_2$.

In parts of this disclosure, the term "transmitter configuration" is used as a generic term for the above mentioned "radio resource configuration".

Some advantages of some embodiments disclosed herein include:
  The UE can utilize its battery power more efficiently during DRX cycle enabling it to have longer battery life while enabling the UE to improvement its performance by using 4 or more Rx antennas.
  The methods ensure consistent and predictable UE behavior during DRX cycle when UE adapts its receiver configuration for receiving control channels and/or performing RLM.
  The methods ensure consistent and predictable UE behavior during DRX cycle when UE adapts its receiver between IM and non-IM and/or between number of receivers for receiving one or more DL control channels and/or performing RLM.
  The UE can utilize its battery power more efficiently during DRX cycle enabling it to have longer battery life while enabling the UE to improvement the decoding performance for receiving one or more DL control channel from one or more serving cells using IM receivers.
  The network node can optimize the DL transmit power on for transmitting the DL control thereby minimizing the UE and system performance loss. This in turn enables the network node to achieve a higher system capacity and throughput.

The UE can utilize its battery power more efficiently when switching between different DRX cycles and when switching between the DRX and non-DRX states.

Example of a Scenario for Receiver Adaptation

In some embodiments the non-limiting term radio network node or simply network node is used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used and it refers to any type of wireless device communicating with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. The term "wireless device" is also used for such UEs.

The embodiments are described in particular for MIMO operation EUTRA/LTE. The embodiments are however applicable to any RAT or multi-RAT system where the UE operates using MIMO e.g. UTRA/HSPA, GSM/GERAN, Wi Fi, WLAN, WiMax, CDMA2000 etc.

The embodiments are applicable to single carrier as well as to multicarrier (MC) or carrier aggregation (CA) operation of the UE in conjunction with at least one inter-cell IM receiver (or simply IM receiver) at the UE. The term carrier aggregation (CA) is also called (e.g. interchangeably called) "multi-carrier system", "multi-cell operation", "multi-carrier operation", "multi-carrier" transmission and/or reception.

The embodiments are applicable to a UE capable of at least one receive antenna and also apply to UE with two or more receive antennas. The embodiments are also applicable in conjunction with MIMO in which the UE is able to receive and/or transmit data to more than one serving cells using MIMO e.g. 2, 4 or 8 receiver antennas at the UE. For example the UE may apply IM receiver on one receiver antenna port or on plurality of receiver antenna ports or may not apply IM receiver on any of the antenna port (i.e. it may use non-IM receiver on all ports). The terms receive antennas, receive antenna ports, receiver diversity, multiple receivers etc are interchangeably used but all bear the same meaning.

The UE is served by at least one serving cell (aka a first serving cell or simply a primary serving cell), which in turn is managed or served by a first network node. The UE may also be served by plurality of serving cells e.g. a first serving cell such as a PCell, a second serving cell such as a first SCell, a third serving cell such as a second SCell and so on in CA. In dual connectivity a first serving cell may be PCell and a second serving cell may be PSCell and third and additional serving cells may be SCells. Different serving cells may be managed or served by the same first network node or by different network nodes e.g. PCell by the first network node and SCell(s) by a second network node and so on.

The UE reception of signals from the serving cell may also be interfered by signals from one or more interfering cells aka inter-cell interference e.g. UE reception from the first serving cell may be interfered by a first interfering cell. For example when receiving a DL control channel (e.g. PDCCH, EPDCCH) from the first serving cell the UE may receive interference in terms of one or more interfering signals from the first interfering cell. Examples of interfering signals (aka inter-cell interfering signals) are PDSCH, PDCCH, CRS, PSS, SSS etc. The UE may apply one or more IM receivers to mitigate inter-cell interference received from one or more interfering cells in order to receive one or more control channels from the serving cell; this is called inter-cell interference mitigation (IM) on DL control channel reception.

In some embodiments a term time resource is used. Examples of time resource are time slot, TTI, subframe, symbol, frame, scheduling period, data and/or control channel reception time or instant etc. Typically the UE can be scheduled during each time resource (e.g. subframe) and therefore the UE generally monitors one or more control channels during each time resource for determining if the UE is scheduled or not.

The UE monitors one or more DL controls from at least the first serving cell for example for receiving control signaling or messages such as scheduling grant for UL transmission, DL scheduling information (e.g. assigned MCS, transport format etc), power control commands, HARQ information etc. Examples of control channels are PDCCH, E-PDCCH (aka ePDCCH), PCFICH, PHICH etc. The term monitoring may also interchangeably be called receiving, decoding, demodulating, acquiring control channel. The resource elements containing EPDCCH are more spread over the subframe. Therefore depending on the UE implementation the processing time may expand over the whole subframe for receiving EPDCCH.

The UE is scheduled with the data in DL (i.e. receives data) from on one or more data channels but at least a first data channel (e.g. PDSCH) from at least the first cell. The UE is scheduled data in DL (i.e. receives data) from on one or more data channels but at least one a first data channel (e.g. PDSCH) from at least the first cell. Therefore data reception corresponds to DL PDSCH demodulation in LTE system.

The UE may further implicitly or explicitly monitor one or more DL controls for observing or assessing the radio link quality of the first cell. This procedure may interchangeably be called radio link monitoring (RLM). In explicit assessment of the radio link quality for the purpose of the RLM, the UE directly monitors one or more control channels. In implicit assessment, the UE first estimate signal quality on DL reference signal (e.g. CRS). The UE then uses predefined mapping between the signal quality and the control channel reception quality to determine the radio link quality of one or more control channels. Examples of control channels that can be used for RLM are broadcast channel, PDCCH, E-PDCCH, PCFICH etc.

The UE is configured with at least one DRX cycle. The UE may also be configured with two or more DRX cycles and in which case the UE may switch between DRX cycles based on traffic activity. For example if there is no traffic activity (i.e. no data received) over a certain time then the UE may switch from shorter to a longer DRX cycles; eventually it may switch to the longest DRX cycle if there is no activity over even longer time. When there is activity (i.e. data reception) the UE may also switch from DRX to non-DRX or from longer DRX cycle to shorter DRX cycle.

The embodiments in the present disclosure may apply to a UE in any RRC state e.g. in RRC idle state as well as in RRC connected state.

Method in UE of Obtaining and Using Control Channel Monitoring Time for Adapting Receiver Configuration In this embodiment, the UE obtains information about DRX configuration status related to at least one DRX cycle configured at the UE by the network node. The obtained information about the DRX configuration comprises at least DRX configuration parameters (e.g. DRX length, ON duration etc). The obtained information about the DRX configuration status may further comprise of one or more of the following:

- a threshold associated with length of DRX cycle (T);
- a threshold associated with the ON duration of the DRX cycle (D);
- determining the actual DRX cycle being used or expected to be used by the UE in case the UE is configured with plurality of DRX cycles;
- determining whether the UE is in DRX state (e.g. inactivity timer is not running after DRX ON i.e. UE has not been scheduled during the DRX ON duration) or in non-DRX state (e.g. inactivity timer is running or UE is also receiving data).

The UE uses one or more of the above sets of information for determining when to use a first or a second receiver configuration for monitoring at least a first control channel and monitors the at least the first channel using the determined first or the second receiver configuration.

Examples of the first receiver configuration are one or combination of the following:

- Number of receivers above a threshold e.g. 4 or more receivers assuming threshold is 2;
- IM receivers, aka inter-cell IM receivers, i.e. receiver capable of at least partly mitigating interference from at least one interfering cell aka aggressor cell, neighbor cell etc. Examples of IM receivers are CRS-IM, MMSE-IRC, CWIC etc.

Examples of the second receiver configuration are one or combination of the following:

- Number of receivers equal to or below a threshold e.g. 2 or one receivers assuming threshold is 2;
- Non-IM receivers i.e. receiver not capable of mitigating interference from any interfering cell e.g. MMSE-MRC etc.

The following main steps performed by the UE are described further below:

- Obtaining information associated with DRX configuration status
- Adapting receiver configuration based on obtained information DRX configuration status
- Transmitting information about DRX configurations to network node
- Obtaining Information about DRX Configuration Status In this step the UE obtains information associated with the DRX configuration of at least one DRX cycle comprise of at least the ON duration (i.e. onDurationTimer) of the DRX cycle and the length of the DLX cycle (T). The information may further comprise information determining whether the UE is currently operating in DRX or in non-DRX, and the DRX cycle when in DRX. The information may further comprise of a threshold associated with a length of the DRX cycle (T) and a threshold associated with the ON duration of the DRX cycle (D).

The UE may obtain any of the above information by one or more of the following means:

- Autonomously;
- Pre-defined information or rule, which may be specified by virtue of a pre-defined performance requirement;
- Current UE receiver activity or configuration information e.g. when UE receiver is active and inactive while being in DRX;
- via a message or indication received from the first network node e.g. using RRC signaling by or other higher level signaling (e.g. MAC messages).

In case the UE obtains the above DRX configuration status information by more than one means then the UE may use one of the obtained values and discard the others e.g. consider only the information receives from the first network node.

The ON duration (D) is used by the UE for setting up a receiver timer ($\delta t$). This may be a first receiver timer ($\delta t_1$) or a second receiver timer ($\delta t_2$).

In some embodiments, the first receiver timer ($\delta t_1$) is always set equal to the ON duration when UE is in DRX state.

In some embodiments, the second receiver timer ($\delta t_2$) may be set equal to the ON duration when UE is in non-DRX state or it starts when UE enters non-DRX state and lasts until the UE leaves the non-DRX state (i.e. revert to DRX state).

The timer in turn is used for triggering the UE to monitor one or more control channels using a particular receiver configuration. For example when the first receiver timer ($\delta t_1$) is running the UE uses the first receiver configuration and when the second receiver timer ($\delta t_2$) the UE uses the second receiver configuration as further explained in the subsequent section. In other words when UE is in DRX state then during DRX ON starting from a time resource, n, (e.g. subframe n), the UE initiates or starts or activates the timer in time resource n provided one or more condition is met (e.g. UE in DRX state, length of DRX cycle etc).

In case the UE has multiple serving cells may obtain and in any of the following means:

- In one example the same information about the DRX configuration status may also be applied by the UE for monitoring control channels from plurality of serving cells of the UE e.g. same DRX configuration is used on all serving cells or on subset of serving cells;
- In a second example separate set of information about the DRX configuration status may be obtained for monitoring control channels for each serving cell even if the same DRX cycle (aka common DRX cycle) is used for all serving cells e.g. one value of DRX configuration for PCell and another one for SCell;
- In a third example separate set of information about the DRX configuration status may be obtained for monitoring control channels for each serving cell if different DRX cycles (aka serving cell specific DRX cycle) are used for different serving cells e.g. one value for PCell and another one for SCell.

The UE may autonomously determine one or more parameters related to the DRX configuration status based on one or more of the following criteria:

UE Battery Life and Power Consumption: If battery level of the UE is below a threshold (e.g. less than 20%) then the UE may decide to restrict the threshold of ON duration (D) to a shorter value (e.g. 10 subframes). But if the UE battery level is above a threshold then it may use a longer threshold of ON duration (D) (e.g. 40 subframes). If battery level of the UE is below a threshold (e.g. less than 20%) then the UE may decide to configure the threshold of the length of the DRX cycle (T) to a longer period (e.g. 40 subframes). But if the UE battery level is above a threshold then it may use a shorter threshold of the length of the DRX cycle (T) (e.g. 10 subframes).

Signal Measurement Level: The UE may decide to restrict the threshold of ON duration (D) to a shorter value and/or longer threshold of the length (T) of the DRX cycle when the signal measurement (e.g. signal strength and/or signal quality such as RSRP and/or RSRQ) of a serving cell is below a threshold. Otherwise when the signal measurement level is above a threshold then the UE may use a longer the threshold of ON duration (D) and/or shorter threshold of the length of the DRX cycle. Other examples of signal quality are SINR, SNR, BLER etc.

Type of Service: In case of certain type of services such as VOIP the UE is served typically periodically e.g. every 20 or 40 ms. In this case the UE may use a shorter threshold of ON duration (D) (e.g. 5 subframes). But for services associated with unpredictable traffic pattern the UE may use a larger value of a threshold of ON duration (D) (e.g. 40 or 80 subframes)

Historical Scheduling Information: The UE may also decide the value of the monitoring time period by taking into account the past DL scheduling pattern (e.g. in the last 100 subframes). For example based on the past history the UE may predict the expected data scheduling pattern in the next few frames. For example if the past pattern reveals that the UE is scheduled sparsely (e.g. in 1-5 subframes every 4th or 5th frame then the UE may use a shorter value of the threshold of ON duration (D) e.g. 10 subframes. Otherwise it may use a longer the threshold of ON duration (D) e.g. 40 subframes.

Adapting Receiver Configuration Based on Obtained DRX Configuration Status

In this step based on DRX configuration status, the UE may decide whether to use:
- a first receiver configuration for receiving at least the first control channel, which comprises of M receive antennas and/or one or more IM receivers per receiver antenna or
- a second receiver configuration, which comprises of L receive antennas and/or non-IM receiver per receiver antenna, for receiving at least the first control channel, where L<M.

When the first receiver timer ($\delta t_1$) is running the UE uses the first receiver configuration. When the second receiver timer ($\delta t_2$) is running the UE uses the second receiver configuration.

More specifically the UE triggers or starts:
- the first receiver timer ($\delta t_1$) when the UE starts operating with a first level of activity and while the $\delta t_1$ is running the UE uses the first receiver configuration, and
- the second receiver timer ($\delta t_2$) when the UE starts operating with a second level of activity and while $\delta t_2$ is running the UE uses the second receiver configuration.

Examples of the first level of UE activity are: when UE is in DRX state, when UE is in DRX whose DRX ON duration≤threshold1, when UE is in DRX whose length of the DRX cycle>threshold2.

Examples of the second level of UE activity are: when UE is in non-DRX state, when UE is in DRX whose DRX ON duration>threshold1, when UE is in DRX whose length of the DRX cycle≤threshold2.

As an example L and M can be 2 and 4 respectively. In another example L and M can be 2 and 8 respectively if the UE support 8 receiver antennas.

The parameters L, M, IM receivers and non-IM receivers may be determined by the UE based on one of:
- pre-defined values of L, M, IM and non-IM receivers;
- implicit determination of L, M, IM and non-IM receivers based on pre-defined UE performance requirements;
- autonomous determination by the UE and
- information received from the first network node.

The first control channel (e.g. PDCCH) will carry scheduling information about the data (e.g. MCS etc) and the corresponding first data channel (e.g. PDSCH) will carry the actual DL data scheduled to the UE.

The method in the UE of adapting between the first and the second receiver configurations based on the DRX configuration status is described with several examples below:

In one example the UE switches between DRX and non-DRX states and the receiver adaptation is based on whether currently the UE is in DRX state or non-DRX state. In this case the UE:
- starts the first receiver timer ($\delta t_1$) from the start of the DRX ON duration provided the UE is in DRX state and uses the first receiver configuration for receiving one or more DL control channels until the expiry of the timer i.e. until end of DRX ON; and
- starts the second receiver timer ($\delta t_2$) when UE enters non-DRX state if the UE is in non-DRX state and uses the second receiver configuration for receiving one or more DL control channels during the non-DRX state until the expiry of the timer i.e. until the UE stays in non-DRX state.

In a second example the UE is only in DRX state and the receiver adaptation is based on the length of the DRX of the current DRX cycle used by the UE. In this case UE:
- starts the first receiver timer ($\delta t_1$) from the start of the DRX ON duration provided the UE is in DRX state and the length of the DLX cycle is above threshold, 'T' (i.e. during DRX ON of the DRX cycle e.g. DRX cycle#1) and uses the first receiver configuration for receiving one or more DL control channels until the expiry of the timer; and
- starts the second receiver timer ($\delta t_2$) from the start of the DRX ON duration provided the UE is in DRX state and the length of the DRX cycle is below or equal to threshold, 'T' (i.e. during DRX ON of the DRX cycle e.g. DRX cycle#2) and uses the second receiver configuration for receiving one or more DL control channels until the expiry of the timer.

Examples of DRX cycles#1 and #2 are 640 ms and 40 ms respectively. Example T is 160 ms.

In a third example the UE is only in DRX state and the receiver adaptation is based on the DRX ON duration of the DRX of the current DRX cycle used by the UE. In this case UE:
- starts the first receiver timer ($\delta t_1$) from the start of the DRX ON duration provided the UE is in DRX state and the DRX ON duration (i.e. $\Delta T1$) of the DRX cycle (e.g. DRX cycle#3) is equal to or below threshold, D, and uses the first receiver configuration for receiving one or more DL control channels until the expiry of the timer; and
- starts the second receiver timer ($\Delta t_2$) from the start of the DRX ON duration provided the UE is in DRX state and the DLX ON duration (i.e. $\Delta T2$) of the DRX cycle (e.g. DRX cycle#4) is above a threshold, D, and uses the second receiver configuration for receiving one or more DL control channels until the expiry of the timer.

Examples of DLX cycles#3 and #4 are 640 ms and 40 ms respectively. In another example DRX cycles#3 and #4 are 320 ms and 320 ms respectively i.e. same DRX cycle period. Example of D is 10 ms. Examples of ΔT1 and ΔT2 are 15 ms and 20 ms, respectively.

A fourth example is combination of any two or more receiver adaption scenarios described in examples 1 to 3 above. For example the UE may be DRX state and adapts its receiver based on both the DRX ON duration as well as on the length of the DRX cycle e.g.

starts the first receiver timer ($\delta t_1$) from the start of the DRX ON duration provided the UE is in DRX state, the DRX ON duration (i.e. ΔT1) of the DRX cycle (e.g. DRX cycle#3) is equal to or below threshold, D, and the DRX cycle length is above a threshold, T, and uses the first receiver configuration for receiving one or more DL control channels until the expiry of the timer and starts the second receiver timer ($\delta t_2$) from the start of the DRX ON duration provided the UE is in DRX state, DRX ON duration (i.e. ΔT2) of the DRX cycle (e.g. DRX cycle#4) is above a threshold, D, or the DRX cycle length is below or equal to a threshold, T, and uses the second receiver configuration for receiving one or more DL control channels until the expiry of the timer.

Transmitting Information about Use of Receiver Timers and/or Receiver Configurations to Network Node In this step the UE may signal information related to one or more of the following parameters used or are being currently used by the UE to the network node (e.g. first network node and/or to the second network node (e.g. in case of DC)) in case the values of these parameters are autonomously determine by the UE:

Threshold of length of DRX cycle;
Threshold for DRX ON duration;
First receiver timer value;
Second receiver timer value;
First receiver configuration;
Second receiver configuration.

In one aspect of this embodiment the UE may report said information proactively or autonomously whenever the UE determines any change in the value of any of these parameters, periodically or whenever the UE sends uplink feedback information (e.g. HARQ feedback, measurement report etc).

In another aspect of this embodiment the UE may report said information upon receiving a request from the first and/or the second network node to transmit the said information. In yet another aspect of this embodiment the first UE may be requested by the first and/or the second network node to report said information only if there is any change in the value of any of these parameters for per carrier.

The first UE may report the said information by using higher layer signaling such as via RRC message to the first network node and/or to the second network node. Such information may also be reported in a MAC message.

Examples of first timer granularity are time slot, TTI, subframe, symbol, frame, scheduling period, data and/or control channel reception time or instant etc.

Method in Network Node of Determining and Configuring Control Channel Monitoring Time Period for UE to Adapt Receiver Configuration In this embodiment a network node (e.g. first network node) determines one or more of the following parameters and configures the UE enabling it to adapt its receiver for the reception of at least one DL control channel:

Length of DRX cycle;
Threshold of length of DRX cycle i.e. to enable UE to switch between first and the second receiver configurations;
DRX ON duration of the DRX cycle i.e. Onduration-Timer;
Threshold for DRX ON duration i.e. to enable UE to switch between first and the second receiver configurations;
First receiver timer value;
Second receiver timer value;
First receiver configuration;
Second receiver configuration.

The network node may e.g. determine only those parameters which are not pre-defined.

The network node may also determine different values of the same type of parameter (e.g. threshold of DRX length) for different serving cells or use the same parameter value for two or more serving cells of the UE. The network node may also determine different values of the same type of parameter for different type of control channels or use the same parameter value for two or more control channels which are to be received by the UE from the same serving cell.

The network node may also determine one or more parameters (e.g. first and/or second receiver timer values) for assessment of serving cell radio link quality e.g. RLM. The values of these parameters may be the same or different compared to those used for the reception of the control channels.

The network node may use one or more of the following criterion for determining the above parameters:

UE Receiver Capability: The network node may determine any of the above parameters for a UE provided the UE has at least certain minimum number of receiver antennas (e.g. at least 4) and/or IM receiver(s) capability. The network node may obtain UE receiver capability information in terms of maximum number of supported receivers and/or in terms of inter-cell IM receiver(s) based on explicit indication received from the UE and/or pre-defined knowledge such as manufacturer's specification and/or based on implicit information such signal quality reports (e.g. CQI reports etc). A UE using larger receivers and/or applying IM receiver(s) for receiving signals will report higher value of CQI compared to UE with fewer receivers and/or when applying non-IM receiver under same radio conditions.

Load: The network node may determine any of the above parameters while taking into account the load which can be expressed in terms of number of UEs in a cell, number of UEs sharing the same control channels etc. For example under higher load the network node may use shorter value of the DRX cycle length and larger length of DRX ON threshold since UEs may not be scheduled very frequent. This is because due to infrequent scheduling of the same UE, the UE power consumption is not very high. But under low load the network node may use longer value of the DRX cycle length and smaller length of DRX ON threshold. This is because under low load fewer UEs are simultaneously scheduled and therefore PDCCH and PCFICH transmit powers can be more easily boosting (e.g. increased by 1-3 dB as more power will be available) when the UE uses the second receiver configuration. Therefore UEs can be easily received by the control channels.

Usage of Other Channels or Signals for Group of UEs: The network node may determine any of the above parameters by taking into account the transmission of channels to plurality of UEs. For example if several UEs need to be scheduled with higher power on PDCCH, then the network node may have to limit the transmit power of control channels to another set of UEs. In this case UEs that cannot be scheduled with higher power may have to be configured to use first receiver configuration regardless of length of DRX cycle and/or ON duration.

The network node may further use one or more additional criteria such as those described in section "Obtaining information about DRX configuration status" above (used by the UE for autonomous determination of parameters related to the DRX configuration status) for determining the values of the parameters e.g. whether to use the ON duration threshold as 10 subframes or 40 frames or larger.

The network node may also transmit the determined one or more parameters to another network node e.g. neighboring network node etc.

Method in Network Node of Using Information about Control Channel Monitoring Time and UE Receiver Adaptation for Radio Operation Tasks In this step the network node uses the obtained information related to the following parameters for performing one or more radio operation tasks. Examples of radio operational or radio resource management tasks are:

Adaptation of Transmit Power on DL Control Channels: When the UE is using the second receiver configuration (i.e. when the second receiver timer is running) then the network node may use a second power level ($P_2$) for transmitting the first control channel (e.g. PDCCH). When the UE is using the first receiver configuration (i.e. when the first receiver timer is running) then the network node may use a first power level ($P_1$) for transmitting at least the first control channel (e.g. PDCCH), where $P_1 < P_2$. In one example the UE may also use $P_1$ for other control channels (e.g. PCFICH, PHICH, ePDCCH) when the first receiver timer is running and $P_2$ for other control channels when the second receiver timer is running. In another example the UE may use different power level $P_3$ for other control channels (e.g. second control channel such as ePDCCH) when the first receiver timer is running and $P_4$ for other control channels when the second receiver timer is running where $P_3 < P_4$. The use of higher transmit power to transmit control channel(s) when the UE uses the second receiver configuration (i.e. fewer receiver antennas) will allow the UE to extend its coverage i.e. can receive control channel even when the serving cell signal strength and/or signal quality are below their respective thresholds. The amount of power change (i.e. difference between $P_1$ and $P_2$ or between $P_3$ and $P_4$ in log scale or their ratio in linear scale) may depend on the number of antennas used by the first and second receiver configurations. For example $P_1$ may be 3 dB smaller than $P_2$ if the number of antennas used in the first and second receiver configurations are 2 and 4 respectively. As an example $P_1$ may be 10 dBm whereas $P_2$ may be 13 dBm.

Radio Resource Management on Control Channels: The network node may also adapt the CFI and/or aggregation level used on one or more control channels depending upon the UE receiver configuration. For example when the maximum Rx antennas and/or IM receivers (e.g. first receiver configuration) are used by UE then smaller CFI with smaller aggregation level could be applied but otherwise higher aggregation level could be applied to make the UE reception performance more robust. The adaptation of CFI and/or aggregation level can be combined with the adaptation of power level as indicated above.

Adapting DRX Cycle Parameters for the UE: The network node may use the obtained parameters to adapt the configuration of DRX cycle for the UE to ensure the UE could use the first receiver configuration to have a robust control channel performance, e.g. the first network node configures a longer On Duration period so the first UE can use such period to monitor control channel with 4Rx antennas and/or IM receivers to get better control channel decoding performance and better coverage.

Transmitting Information to Other Network Nodes: The network node may also signal the information related to one or more radio operation tasks performed by the network node to another network node. For example the first network node may send it to the second network node and/or to even a third network node (e.g. neighboring base station such as by serving eNode B to neighboring eNode over X2 interface in LTE) etc. The receiving network node may use the received information for one or more radio tasks.

As has been described above, the UE could use fewer Rx antennas (e.g. 2) and/or non-IM receiver than its maximum capability (e.g. 4 Rx and/or IM capability) for receiving control channels provided that the UE is not in DRX cycle or when On Duration period of a DRX cycle>threshold1 or DRX cycle≤threshold2, while the UE uses more Rx antennas and/or IM receiver for receiving control channels provided that the UE is in DRX cycle and/or when On Duration period of a DRX cycle≤threshold1 and/or DRX cycle>threshold2. This enables the UE to save its battery power. The network could also use this information (e.g. pre-defined UE behavior) to adapt one or more parameters related to radio resource configuration used for transmitting control channels to the UE. For example the network node may boost transmit power on one or more DL control channels when the UE uses fewer receivers and/or non-IM receiver for control channel reception. This enables the UE to retain its coverage regardless of whether the UE uses: fewer receivers and/or non-IM receiver, or maximum or larger receiver antennas and/or IM receivers for the DL control channel reception.

Description of Flowcharts

FIGS. 3-4 show flowcharts generically illustrating methods according to embodiments disclosed herein. FIG. 3 is a flowchart of a method, performed in a wireless device (above denoted "UE") of a cellular communication system, of monitoring a control channel of the cellular communication system. The wireless device has a first receiver configuration and a second receiver configuration and is capable of operating in discontinuous reception (DRX). Operation of the method 100 is started in step 105. The method 100 comprises determining a DRX configuration of the wireless device, wherein the DRX configuration indicates a time period during which the wireless device should monitor the control channel. This is illustrated in FIG. 3 with the step 110. The term DRX configuration is used herein to denote if and/or how (e.g. with what parameters) the wireless device currently is configured to employ DRX, which is illustrated with a number of examples below. The method 100 comprises monitoring the control channel during said time period using the first receiver configuration if the DRX configuration is a first DRX configuration. This is illustrated in FIG. 3 with steps 115 and 120, following the branch labeled "FIRST" from step 115. The method 100 comprises monitoring the control channel during said time period using the second receiver configuration if the DRX configuration is a second DRX configuration. This is illustrated in FIG. 3 with steps 115 and 130, following the branch labeled "SECOND" from step 115. The operation of the method 100 is ended in step 140. The method 100 can be repeated as necessary or desired, e.g. repeated continually.

As has been touched upon above, the first receiver configuration can provide an enhanced reception performance compared with the second receiver configuration. This could, as has also been touched upon above, come to some cost, e.g. a higher power consumption. Therefore, by switching to the second receiver configuration, power consumption, and/or consumption of other resources, could typically be reduced.

In line with what has been described above, in some embodiments, the wireless device has a plurality of antenna ports and is configured to use a first number M of antenna ports in the first receiver configuration and a second number L, smaller than M, of antenna ports in the second receiver configuration.

Also in line with what has been described above, in some embodiments the wireless device is configured to apply a certain interference-mitigation technique to a receiver of the wireless device in the first receiver configuration, and to not apply the certain interference-mitigation technique to said receiver in the second receiver configuration.

As has been described above, various alternatives are available for characterizing the first DRX configuration and the second DRX configuration.

In some embodiments the wireless device is configured to operate in a DRX state in the first DRX configuration, and operate in a non-DRX state in the second DRX configuration.

In some embodiments, the wireless device is configured to operate in a DLX state with a first DRX ON duration in the first DRX configuration, and operate in a DRX state with a second DRX ON duration in the second DRX configuration, wherein the first DRX ON duration is shorter than the second DRX ON duration. In line with what has been described above, the DRX ON duration can be seen as the time period during which the wireless device should monitor the control channel. For example, as has been illustrated above, in some embodiments, the DRX configuration is the second DRX configuration if the wireless device operates in a DRX state with a DRX ON duration that exceeds a first threshold, and the DRX configuration is the first DRX configuration if the wireless device operates in a DRX state with a DRX ON duration that is less than or equal to the first threshold.

In some embodiments, the wireless device is configured to operate in a DRX state with a first DRX cycle in the first DRX configuration, and operate in a DRX state with a second DRX cycle in the second DRX configuration, wherein the first DRX cycle is longer than the second DRX cycle. For example, as has been illustrated above, in some embodiments, the DRX configuration is the first DRX configuration if the wireless device operates in a DRX state with a DRX cycle length that exceeds a second threshold, and the DRX configuration is the second DRX configuration if the wireless device operates in a DRX state with a DRX cycle length that is less than or equal to the second threshold.

Some embodiments described above utilize timers (below denoted first timer and second timer) to determine, or control, which of the first receiver configuration or the second receiver configuration to use for monitoring the control channel. Generically, in such embodiments, the method 100 can be described as comprising starting the first timer at the beginning of said time period and monitoring the control channel until the first timer expires using the first receiver configuration if the DRX configuration is the first DRX configuration, or starting the second timer at the beginning of said time period and monitoring the control channel until the second timer expires using the second receiver configuration if the DRX configuration is the second DRX configuration.

FIG. 4 is a flowchart of a method, performed in a network node of a cellular communication system. A wireless device of the cellular communication system is capable of operating in DRX. The network node has a first transmitter configuration and a second transmitter configuration. The term "transmitter configuration" used in this section includes the term "radio resource configuration" used above. Operation of the method 200 is started in step 205. The method 200 comprises configuring the DRX configuration of the wireless device. As above, the DRX configuration indicates a time period during which the wireless device should monitor the control channel of the cellular communication system. This is illustrated in FIG. 4 with the step 210. The method 200 comprises transmitting signals over the control channel to the wireless device during said time period using the first transmitter configuration if the DRX configuration is a first DRX configuration. This is illustrated in FIG. 4 with steps 215 and 220, following the branch labeled "FIRST" from step 215. The method 200 comprises transmitting signals over the control channel to the wireless device during said time period using the second transmitter configuration if the DRX configuration is a second DRX configuration. This is illustrated in FIG. 4 with steps 215 and 230, following the branch labeled "SECOND" from step 215.

As has been touched upon above, the second transmitter configuration can provide an enhanced transmission performance compared with the first transmitter configuration. Thereby, the network node can, at least to some extent, compensate for a reduced reception performance in the wireless device operating with the second receiver configuration in the third time period (compared with the first receiver configuration used in the second time period).

For example, the network node may be configured to use a first transmission power level $P_1$ in the first transmitter configuration and a second transmission power level $P_2$, higher than $P_1$, in the second transmitter configuration. Alternatively or additionally, the network node may be configured to use a first aggregation level in the first transmitter configuration and a second aggregation level, higher than the first aggregation level, in the second transmitter configuration.

As indicated above, the method may also comprise transmitting information about the first transmitter configuration and the second transmitter configuration to another network node.

Various alternatives available for characterizing the first DRX configuration and the second DRX configuration of the wireless device are described above in the description of FIG. 3. This description is not repeated here.

On a system level, the methods 100 and 200 can be combined to a method performed in a cellular communication system, wherein the cellular communication system comprises the network node and the wireless device. This method comprises performing the method 200 in the network node and the method 100 in the wireless device.

Description of Block Diagrams

FIGS. 5-6 show block diagrams generically illustrating a wireless device 300 and a network node 400 according to embodiments disclosed herein. FIG. 5 is a simplified block diagram of a wireless device 300 for a cellular communication system according to an embodiment. The wireless device is capable of operating in DRX, and comprises a receiver unit 310 having the above mentioned first receiver configuration and second receiver configuration. Furthermore, the wireless device comprises a control unit 320 operatively connected to the receiver unit 310. The control unit 320 may be configured to cause the method 100 described above to be performed in the wireless device 300. For example, the control unit 320 can be adapted to determine the DRX configuration of the wireless device. Furthermore, the control unit 320 can be configured to control the receiver unit 310 to monitor the control channel during said time period using the first receiver configuration if the DRX configuration is the above-mentioned first DRX configuration, or monitor the control channel during said time period using the second receiver configuration if the DRX configuration is the above-mentioned second DRX configuration.

The wireless device 300 may comprise other circuitry, such as a transmitter unit for transmitting signals in the cellular communication system, as well in addition the circuits explicitly shown in FIG. 5.

In line with what has been described above, the receiver unit 310 may have a plurality of antenna ports and be configured to use a first number M of antenna ports in the first receiver configuration and a second number L, smaller than M, of antenna ports in the second receiver configuration.

Also in line with what has been described above, the receiver unit 310 may be configured to apply a certain interference-mitigation technique to a receiver of the wireless device in the first receiver configuration, and to not apply the certain interference-mitigation technique to said receiver in the second receiver configuration. Said receiver may e.g. be a sub-component of the receiver unit 310.

As illustrated in FIG. 5, the wireless device 300 may comprise the above-mentioned first and second timer (denoted with reference numbers 330 and 340, respectively, in FIG. 5). In such embodiments, the control unit 320 may be adapted to start the first timer at the beginning of said time period and control the receiver unit to monitor the control channel until the first timer expires using the first receiver configuration if the DRX configuration is the first DRX configuration. Furthermore, the control unit 320 may be adapted to start the second timer at the beginning of said time period and control the receiver unit to monitor the control channel until the second timer expires using the second receiver configuration if the DRX configuration is the second DRX configuration.

Various alternatives available for characterizing the first DRX configuration and the second DRX configuration of the wireless device are described above in the description of FIG. 3. This description is not repeated here.

FIG. 6 is a simplified block diagram of a network node 400 (such as a base station) of a cellular communication system according to an embodiment. The network node 400 comprises a transmitter unit 410 having the above-mentioned first transmitter configuration and second transmitter configuration and a control unit 420 operatively connected to the transmitter unit 410. The network node 400 is configured to operate within a cellular communication system wherein a wireless device, such as the wireless device 300, of the cellular communication system is capable of operating in discontinuous reception DRX. The control unit 420 may be configured to cause the method 200 described above to be performed in the network node 400. For example, the control unit 420 may be adapted to configure the DRX configuration of the wireless device 300. The control unit 420 can be adapted to control the transmitter unit to transmit signals over the control channel to the wireless device during said time period using the first transmitter configuration if the DRX configuration is the above-mentioned first DRX configuration. The control unit 420 can be adapted to control the transmitter unit to transmit signals over the control channel to the wireless device during said time period using the second transmitter configuration if the DRX configuration is the above-mentioned second DRX configuration.

The network node 400 may comprise other circuitry, such as a receiver unit for receiving signals in the cellular communication system, as well in addition the circuits explicitly shown in FIG. 6.

In line with what has been described above, wherein the second transmitter configuration may provide an enhanced transmission performance compared with the first transmitter configuration. For example, the transmitter unit 410 may be configured to use a first transmission power level $P_1$ in the first transmitter configuration and a second transmission power level $P_2$, higher than $P_1$, in the second transmitter configuration. Alternatively or additionally, the transmitter unit 410 may be configured to use a first aggregation level in the first transmitter configuration and a second aggregation level, higher than the first aggregation level, in the second transmitter configuration.

As indicated above, the network node 400 may be configured to transmit information about the first transmitter configuration and the second transmitter configuration to another network node.

Various alternatives available for characterizing the first DRX configuration and the second DRX configuration of the wireless device are described above in the description of FIG. 3. This description is not repeated here.

Figure 7:
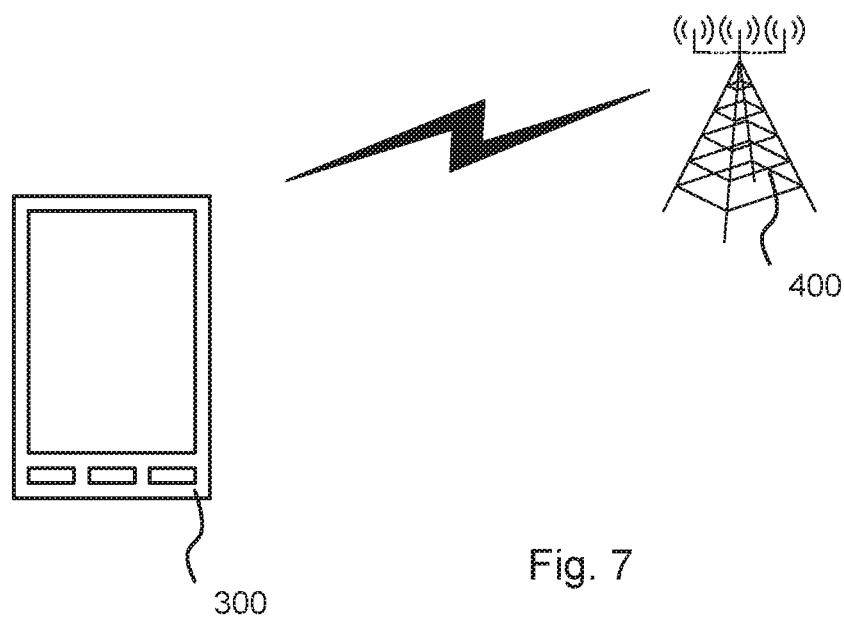
FIG. 7 illustrates part of a communication system.

FIG. 7 generically illustrates part of a cellular communication system comprising the network node 400 and the wireless device 300.

Description of Figures Relating to Programmable Control Units

In some embodiments, the control unit 320 may be implemented as a dedicated application-specific hardware unit. Alternatively, said control unit 320, or parts thereof, may be implemented with programmable and/or configurable hardware units, such as but not limited to one or more field-programmable gate arrays (FPGAs), processors, or microcontrollers. Thus, the control unit 320 may be a programmable control unit 320, such as a processor circuit or a processor circuit with memory. The same goes for the control unit 420; in some embodiments it may be implemented as a dedicated application-specific hardware unit, and in other embodiments it may be a programmable control unit 420, such as a processor circuit or a processor circuit with memory. Hence, embodiments described herein may be embedded in a computer program product, which enables implementation of the method and functions described herein, e.g. the embodiments of the methods 100 and 200 described with reference to FIGS. 3 and 4.

Figure 8:
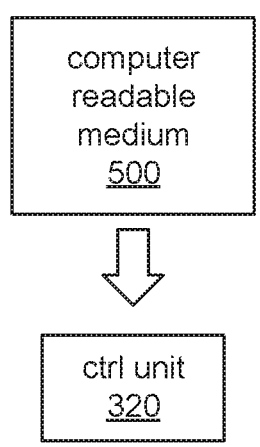
FIGS. 8-9 schematically illustrate computer readable media.

Therefore, according to some embodiments, there is provided a computer program product comprising computer program code for executing the method 100 when said computer program code is executed by the programmable control unit 320 of the wireless device 300. The computer program product may be stored on a computer-readable medium 500 as illustrated in FIG. 8. The computer readable medium 500 may e.g. be a non-transitory computer readable medium.

Figure 9:
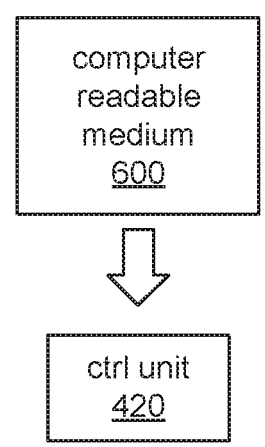

Similarly, according to some embodiments, there is provided a computer program product comprising computer program code for executing the method 200 when said computer program code is executed by the programmable control unit 420 of the network node 400. The computer program product may be stored on a computer-readable medium 600 as illustrated in FIG. 9. The computer readable medium 600 may e.g. be a non-transitory computer readable medium.

The present disclosure has been provided above with reference to specific embodiments. However, other embodiments than the above described are possible within the scope of the disclosure. Different method steps than those described above, performing the method by hardware or software, may be provided within the scope of the disclosure. The different features and steps of the embodiments may be combined in other combinations than those described.

ABBREVIATIONS

Some abbreviations used in this disclosure are listed below
MIMO Multiple input multiple output
HSPA High Speed Packet Access
HSDPA High Speed Downlink Packet Access
LTE Long term evolution
HARQ Hybrid automatic repeat request
HARQ RTT HARQ Round Trip Time
CRC Cyclic redundancy check
NACK non-acknowledgement
ACK acknowledgement
UE User Equipment
IM Interference mitigation
IC Interference cancellation
CQI Channel quality information
TTI Transmit Time Interval
PRS Positioning Reference Signal
CRS Cell-specific Reference Signal
PSS Primary Synchronization Signal
SSS Secondary Synchronization Signal
PBCH Physical Broadcast Channel
EPDCCH Enhanced PDCCH
PDCCH Physical downlink control channel
PDSCH Physical downlink data channel
HS-PDSCH High-Speed PDSCH
SCCH Synchronization Control Channel
HS-SCCH High-Speed SCCH
PCFICH Physical control format indicator channel
CPICH Common Pilot Channel
P-CPICH Primary CPICH
S-CPICH Secondary CPICH
DPCCH Dedicated Physical Control Channel
F-DPCCH Fractional DPCCH
CFI Control format indicator
RRM Radio resource management
RLM Radio link monitoring
RSRP Reference Signal Received Power
RSRQ Reference Signal Received Quality
CCH Control channels
MMSE Minimum mean square error
MMSE-MRC MMSE-maximum ratio combining
MMSE-IRC MMSE-interference rejection combining
E-MMSE-IRC Enhanced-MMSE-IRC
ML Maximum Likelihood
R-ML Reduced complexity ML
CWIC Code word interference cancellation
DRX Discontinuous reception
SNR Signal-to-Noise Ratio
SINR Signal-to-Interference-and-Noise Ratio
BLER Block-Error Rate

The invention claimed is:

1. A method, performed in a wireless device of a cellular communication system, wherein the wireless device has a first receiver configuration and a second receiver configuration and is capable of operating in discontinuous reception—DRX—, of monitoring a control channel of the cellular communication system, the method comprising:
determining a DRX configuration of the wireless device, wherein the DRX configuration comprises a first DRX configuration and a second DRX configuration for indicating a time period during which the wireless device should monitor the control channel; and
monitoring the control channel during said time period using the first receiver configuration when the DRX configuration is a first DRX configuration; or
monitoring the control channel during said time period using the second receiver configuration when the DRX configuration is a second DRX configuration, wherein the DRX configuration is the second DRX configuration when the wireless device operates in a DRX state with a DRX ON duration that exceeds a first threshold, and the DRX configuration is the first DRX configuration when the wireless device operates in a DRX state with a DRX ON duration that is less than or equal to the first threshold, wherein DRX ON duration is the time period during which the wireless device should monitor the control channel and wherein the DRX configuration is the first DRX configuration when the wireless device operates in a DRX state with a DRX cycle length that exceeds a second threshold, and the DRX configuration is the second DRX configuration when the wireless device operates in a DRX state with a DRX cycle length that is less than or equal to the second threshold,
wherein the first and second thresholds include a battery level, a signal measurement, a type of service or historical scheduling information,
wherein the wireless device has a plurality of antenna ports and is configured to use a first number M of antenna ports in the first receiver configuration and a second number L, smaller than M, of antenna ports in the second receiver configuration,
wherein the wireless device is configured to apply a certain interference-mitigation technique to a receiver of the wireless device in the first receiver configuration, and to not apply the certain interference-mitigation (IM) technique to said receiver in the second receiver configuration, and
wherein the first receiver configuration includes an IM receiver and the second receiver configuration includes a non-IM receiver.

2. The method according to claim 1, wherein the first receiver configuration provides an enhanced reception performance compared with the second receiver configuration.

3. The method according to claim 1, wherein the wireless device is configured to:
operate in a DRX state in the first DRX configuration; and
operate in a non-DRX state in the second DRX configuration.

4. The method according to claim 1, wherein the wireless device is configured to:
operate in a DRX state with a first DRX ON duration in the first DRX configuration; and
operate in a DRX state with a second DRX ON duration in the second DRX configuration;
wherein DRX ON duration is the time period during which the wireless device should monitor the control channel; and the first DRX ON duration is shorter than the second DRX ON duration.

5. The method according to claim 1, wherein the wireless device is configured to:
operate in a DRX state with a first DRX cycle in the first DRX configuration; and
operate in a DRX state with a second DRX cycle in the second DRX configuration;
wherein the first DRX cycle is longer than the second DRX cycle.

6. The method according to claim 1, wherein the wireless device comprises a first timer and a second timer, and the method comprises:
starting the first timer at the beginning of said time period and monitoring the control channel until the first timer expires using the first receiver configuration when the DRX configuration is the first DRX configuration; or
starting the second timer at the beginning of said time period and monitoring the control channel until the second timer expires using the second receiver configuration when the DRX configuration is the second DRX configuration.

7. method, performed in a network node of a cellular communication system, wherein a wireless device of the cellular communication system is capable of operating in discontinuous reception—DRX—and wherein the network node has a first transmitter configuration and a second transmitter configuration, of transmitting signals to the wireless device, the method comprising:
configuring a DRX configuration of the wireless device, wherein the DRX configuration comprises a first DRX configuration and a second DRX configuration for indicating a time period during which the wireless device should monitor a control channel of the cellular communication system; and
transmitting signals over the control channel to the wireless device during said time period using the first transmitter configuration when the DRX configuration is a first DRX configuration; or
transmitting signals over the control channel to the wireless device during said time period using the second transmitter configuration when the DRX configuration is a second DRX configuration, wherein the DRX configuration is the second DRX configuration when the wireless device operates in a DRX state with a DRX ON duration that exceeds a first threshold, and the DRX configuration is the first DRX configuration when the wireless device operates in a DRX state with a DRX ON duration that is less than or equal to the first threshold, wherein DRX ON duration is the time period during which the wireless device should monitor the control channel and wherein the DRX configuration is the first DRX configuration when the wireless device operates in a DRX state with a DRX cycle length that exceeds a second threshold, and the DRX configuration is the second DRX configuration when the wireless device operates in a DRX state with a DRX cycle length that is less than or equal to the second threshold,
wherein the first and second thresholds include a battery level, a signal measurement, a type of service or historical scheduling information,
wherein the wireless device has a plurality of antenna ports and is configured to use a first number M of antenna ports in the first receiver configuration and a second number L, smaller than M, of antenna ports in the second receiver configuration,
wherein the wireless device is configured to apply a certain interference-mitigation technique to a transmitter of the wireless device in the first transmitter configuration, and to not apply the certain interference-mitigation (IM) technique to said transmitter in the second transmitter configuration, and
wherein the first transmitter configuration includes an IM transmitter and the second transmitter configuration includes a non-IM transmitter.

8. The method according to claim 7, wherein the second transmitter configuration provides an enhanced transmission performance compared with the first transmitter configuration.

9. The method according to claim 7, wherein the network node is configured to use a first transmission power level P1 in the first transmitter configuration and a second transmission power level P2, higher than P1, in the second transmitter configuration.

10. The method according to claim 7, wherein the network node is configured to use a first aggregation level in the first transmitter configuration and a second aggregation level, higher than the first aggregation level, in the second transmitter configuration.

11. The method according to claim 7, wherein the wireless device is configured to:
operate in a DRX state in the first DRX configuration; and
operate in a non-DRX state in the second DRX configuration.

12. The method according to claim 7, wherein the wireless device is configured to:
operate in a DRX state with a first DRX ON duration in the first DRX configuration; and
operate in a DRX state with a second DRX ON duration in the second DRX configuration;
wherein DRX ON duration is the time period during which the wireless device should monitor the control channel; and
the first DRX ON duration is shorter than the second DRX ON duration.

13. The method according to claim 7, wherein the wireless device is configured to:
operate in a DRX state with a first DRX cycle in the first DRX configuration; and
operate in a DRX state with a second DRX cycle in the second DRX configuration;
wherein the first DRX cycle is longer than the second DRX cycle.

14. The method according to claim 7, further comprising transmitting the information about the first transmitter configuration and the second transmitter configuration to another network node.

15. A nontransitory computer readable storage medium having stored thereon a computer program product comprising computer program code for executing a method when said computer program code is executed by a programmable control unit a wireless device, wherein the wireless device is of a cellular communication system, wherein the wireless device has a first receiver configuration and a second receiver configuration and is capable of operating in discontinuous reception—DRX—, of monitoring a control channel of the cellular communication system, the method comprising:
determining a DRX configuration of the wireless device, wherein the DRX configuration comprises a first DRX configuration and a second DRX configuration for indicating a time period during which the wireless device should monitor the control channel; and monitoring the control channel during said time period using the first receiver configuration when the DRX configuration is a first DRX configuration; or monitoring the control channel during said time period using the second receiver configuration when the DRX configuration is a second DRX configuration, wherein the DRX configuration is the second DRX configuration when the wireless device operates in a DRX state with a DRX ON duration that exceeds a first threshold, and the DRX configuration is the first DRX configuration when the wireless device operates in a DRX state with a DRX ON duration that is less than or equal to the first threshold, wherein DRX ON duration is the time period during which the wireless device should monitor the control channel and wherein the DRX configuration is the first DRX configuration when the wireless device operates in a DRX state with a DRX cycle length that exceeds a second threshold, and the DRX configuration is the second DRX configuration when the wireless device operates in a DRX state with a DRX cycle length that is less than or equal to the second threshold, wherein the first and second thresholds include a battery level, a signal measurement, a type of service or historical scheduling information, wherein the wireless device has a plurality of antenna ports and is configured to use a first number M of antenna ports in the first receiver configuration and a second number L, smaller than M, of antenna ports in the second receiver configuration, wherein the wireless device is configured to apply a certain interference-mitigation technique to a receiver of the wireless device in the first DRX configuration, and to not apply the certain interference-mitigation (IM) technique to said receiver in the second DRX configuration, and wherein the first DRX configuration includes an IM receiver and the second DRX configuration includes a non-IM receiver.

16. A nontransitory computer readable storage medium having stored thereon a computer program product comprising computer program code for executing a method when said computer program code is executed by a programmable control unit of a network node of a cellular communication system, wherein a wireless device of the cellular communication system is capable of operating in discontinuous reception—DRX—and wherein the network node has a first transmitter configuration and a second transmitter configuration, of transmitting signals to the wireless device, the method comprising:

configuring a DRX configuration of the wireless device, wherein the DRX configuration comprises a first DRX configuration and a second DRX configuration for indicating a time period during which the wireless device should monitor a control channel of the cellular communication system; and transmitting signals over the control channel to the wireless device during said time period using the first transmitter configuration when the DRX configuration is a first DRX configuration; or transmitting signals over the control channel to the wireless device during said time period using the second transmitter configuration when the DRX configuration is a second DRX configuration, wherein the DRX configuration is the second DRX configuration when the wireless device operates in a DRX state with a DRX ON duration that exceeds a first threshold, and the DRX configuration is the first DRX configuration when the wireless device operates in a DRX state with a DRX ON duration that is less than or equal to the first threshold, wherein DRX ON duration is the time period during which the wireless device should monitor the control channel, and wherein the DRX configuration is the first DRX configuration when the wireless device operates in a DRX state with a DRX cycle length that exceeds a second threshold, and the DRX configuration is the second DRX configuration when the wireless device operates in a DRX state with a DRX cycle length that is less than or equal to the second threshold, wherein the first and second thresholds include a battery level, a signal measurement, a type of service or historical scheduling information, wherein the wireless device has a plurality of antenna ports and is configured to use a first number M of antenna ports in the first receiver configuration and a second number L, smaller than M, of antenna ports in the second receiver configuration, wherein the wireless device is configured to apply a certain interference-mitigation technique to a transmitter of the wireless device in the first transmitter configuration, and to not apply the certain interference-mitigation (IM) technique to said transmitter in the second transmitter configuration, and wherein the first transmitter configuration includes an IM transmitter and the second transmitter configuration includes a non-IM transmitter.

17. A wireless device for a cellular communication system, wherein the wireless device is capable of capable of operating in discontinuous reception—DRX—, comprising:

a receiver unit having a first receiver configuration and a second receiver configuration;

a control unit operatively connected to the receiver unit; wherein the control unit is adapted to:

determine a DRX configuration of the wireless device, wherein the DRX configuration comprises a first DRX configuration and a second DRX configuration for indicating a time period during which the wireless device should monitor a control channel; and control the receiver unit to:

monitor the control channel during said time period using the first receiver configuration when the DRX configuration is a first DRX configuration; or monitor the control channel during said time period using the second receiver configuration when the DRX configuration is a second DRX configuration, wherein the DRX configuration is the second DRX configuration when the wireless device operates in a DRX state with a DRX ON duration that exceeds a first threshold, and the DRX configuration is the first DRX configuration when the wireless device operates in a DRX state with a DRX ON duration that is less than or equal to the first threshold, wherein DRX ON duration is the time period during which the wireless device should monitor the control channel, and wherein the DRX configuration is the first DRX configuration when the wireless device operates in a DRX state with a DRX cycle length that exceeds a second threshold, and the DRX configuration is the second DRX configuration when the wireless device operates in a DRX state with a DRX cycle length that is less than or equal to the second threshold, wherein the first and second thresholds include a battery level, a signal measurement, a type of service or historical scheduling information, wherein the wireless device has a plurality of antenna ports and is configured to use a first number M of antenna ports in the first receiver configuration and a second number L, smaller than M, of antenna ports in the second receiver configuration, wherein the wireless device is configured to apply a certain interference-mitigation technique to a receiver of the wireless device in the first receiver configuration, and to not apply the certain interference-mitigation (IM) technique to said receiver in the second receiver configuration, and wherein the first receiver configuration includes an IM receiver and the second receiver configuration includes a non-IM receiver.

18. The wireless device according to claim 17, wherein the first receiver configuration provides an enhanced reception performance compared with the second receiver configuration.

19. The wireless device according to claim 17, wherein the receiver unit has a plurality of antenna ports and is configured to use a first number M of antenna ports in the first receiver configuration and a second number L, smaller than M, of antenna ports in the second receiver configuration.

20. The wireless device according to claim 17, wherein the receiver unit is configured to apply a certain interference-mitigation technique to a receiver of the wireless device in the first receiver configuration, and to not apply the certain interference-mitigation technique to said receiver in the second receiver configuration.

21. The wireless device according to claim 17, wherein the wireless device is configured to:
operate in a DRX state in the first DRX configuration; and
operate in a non-DRX state in the second DRX configuration.

22. The wireless device according to claim 17, wherein the wireless device is configured to:
operate in a DRX state with a first DRX ON duration in the first DRX configuration; and
operate in a DRX state with a second DRX ON duration in the second DRX configuration;
wherein DRX ON duration is the time period during which the wireless device should monitor the control channel; and
the first DRX ON duration is shorter than the second DRX ON duration.

23. The wireless device according to claim 17, wherein the wireless device is configured to:
operate in a DRX state with a first DRX cycle in the first DRX configuration; and
operate in a DRX state with a second DRX cycle in the second DRX configuration;
wherein the first DRX cycle is longer than the second DRX cycle.

24. The wireless device according to claim 17, wherein the wireless device comprises a first timer and a second timer, and the control unit is configured to:
start the first timer at the beginning of said time period and control the receiver unit to monitor the control channel until the first timer expires using the first receiver configuration when the DRX configuration is the first DRX configuration; or
start the second timer at the beginning of said time period and control the receiver unit to monitor the control channel until the second timer expires using the second receiver configuration when the DRX configuration is the second DRX configuration.

25. A network node, configured to operate within a cellular communication system wherein a wireless device of the cellular communication system is capable of operating in discontinuous reception—DRX—, comprising:
a transmitter unit having a first transmitter configuration and a second transmitter configuration; and
a control unit operatively connected to the transmitter unit; wherein
the control unit is adapted to configure a DRX configuration of the wireless device, wherein the DRX configuration comprises a first DRX configuration and a second DRX configuration for indicating a time period during which the wireless device should monitor a control channel of the cellular communication system; and control the transmitter unit to:
transmit signals over the control channel to the wireless device during said time period using the first transmitter configuration when the DRX configuration is a first DRX configuration; or
transmit signals over the control channel to the wireless device during said time period using the second transmitter configuration when the DRX configuration is a second DRX configuration, wherein the DRX configuration is the second DRX configuration when the wireless device operates in a DRX state with a DRX ON duration that exceeds a first threshold, and the DRX configuration is the first DRX configuration when the wireless device operates in a DRX state with a DRX ON duration that is less than or equal to the first threshold, wherein DRX ON duration is the time period during which the wireless device should monitor the control channel, and wherein the DRX configuration is the first DRX configuration when the wireless device operates in a DRX state with a DRX cycle length that exceeds a second threshold, and the DRX configuration is the second DRX configuration when the wireless device operates in a DRX state with a DRX cycle length that is less than or equal to the second threshold,
wherein the first and second thresholds include a battery level, a signal measurement, a type of service or historical scheduling information,
wherein the wireless device has a plurality of antenna ports and is configured to use a first number M of antenna ports in the first receiver configuration and a second number L, smaller than M, of antenna ports in the second receiver configuration,
wherein the wireless device is configured to apply a certain interference-mitigation technique to a transmitter of the wireless device in the first transmitter configuration, and to not apply the certain interference-mitigation (IM) technique to said transmitter in the second transmitter configuration, and
wherein the first transmitter configuration includes an IM transmitter and the second transmitter configuration includes a non-IM transmitter.

26. The network node according to claim 25, wherein the second transmitter configuration provides an enhanced transmission performance compared with the first transmitter configuration.

27. The network node according to claim 25, wherein the network node is configured to use a first transmission power level P1 in the first transmitter configuration and a second transmission power level P2, higher than P1, in the second transmitter configuration.

28. The network node according to claim 25, wherein the transmitter unit is configured to use a first aggregation level in the first transmitter configuration and a second aggregation level, higher than the first aggregation level, in the second transmitter configuration.

29. The network node according to claim 25, wherein the wireless device is configured to:
operate in a DRX state in the first DRX configuration; and
operate in a non-DRX state in the second DRX configuration.

30. The network node according to claim 25, wherein the wireless device is configured to:
operate in a DRX state with a first DRX ON duration in the first DRX configuration; and
operate in a DRX state with a second DRX ON duration in the second DRX configuration;
wherein DRX ON duration is the time period during which the wireless device should monitor the control channel; and
the first DRX ON duration is shorter than the second DRX ON duration.

31. The network node according to claim 25, wherein the wireless device is configured to:
operate in a DRX state with a first DRX cycle in the first DRX configuration; and
operate in a DRX state with a second DRX cycle in the second DRX configuration;
wherein the first DRX cycle is longer than the second DRX cycle.

32. The network node according to claim 25, wherein the network node is configured to transmit information about the first transmitter configuration and the second transmitter configuration to another network node.

* * * * *